United States Patent
Chen et al.

(10) Patent No.: US 10,401,908 B2
(45) Date of Patent: Sep. 3, 2019

(54) ELECTRONIC DEVICE

(71) Applicant: Acer Incorporated, New Taipei (TW)

(72) Inventors: Hung-Chi Chen, New Taipei (TW);
Hsueh-Chih Peng, New Taipei (TW);
Yi-Chang Lai, New Taipei (TW);
Cheng-Yu Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/004,452

(22) Filed: Jun. 11, 2018

(65) Prior Publication Data

US 2019/0129474 A1 May 2, 2019

(30) Foreign Application Priority Data

Nov. 2, 2017 (TW) .............................. 106137887 A

(51) Int. Cl.
*G06F 1/16* (2006.01)
*F03G 7/06* (2006.01)
*G09F 9/30* (2006.01)
*G02F 1/1333* (2006.01)
*G06F 1/20* (2006.01)

(52) U.S. Cl.
CPC ........... *G06F 1/1652* (2013.01); *F03G 7/065* (2013.01); *G02F 1/133305* (2013.01); *G06F 1/1616* (2013.01); *G09F 9/301* (2013.01); *G06F 1/203* (2013.01); *G06F 2200/203* (2013.01)

(58) Field of Classification Search
CPC ... G02F 1/133305; G09F 9/301; G06F 1/1652
See application file for complete search history.

(56) References Cited

U.S. PATENT DOCUMENTS

| | | | | |
|---|---|---|---|---|
| 9,081,540 B1* | 7/2015 | Cho | ...................... | G06F 1/1601 |
| 9,123,290 B1* | 9/2015 | Cho | ...................... | G06F 1/1652 |
| 9,307,658 B2* | 4/2016 | Song | ................... | H05K 5/0217 |
| 9,576,510 B2* | 2/2017 | Ren | ......................... | G09F 9/301 |
| 9,934,708 B2* | 4/2018 | Sun | ......................... | G09F 9/301 |
| 9,978,293 B2* | 5/2018 | Cho | ...................... | H05K 5/0217 |
| 9,980,399 B2* | 5/2018 | Cho | ....................... | G09F 9/301 |
| 10,002,551 B2* | 6/2018 | Hu | ......................... | H05K 1/148 |

(Continued)

FOREIGN PATENT DOCUMENTS

| | | |
|---|---|---|
| CN | 104006357 | 8/2014 |
| JP | 2008287402 | 11/2008 |

OTHER PUBLICATIONS

"Search Report of Europe Counterpart Application", dated Dec. 3, 2018, p. 1-p. 10.

*Primary Examiner* — Adrian S Wilson
(74) *Attorney, Agent, or Firm* — JCIPRNET

(57) ABSTRACT

An electronic device includes a flexible display panel and a shape memory component. The flexible display panel is driven by the shape memory component, herein when a temperature of the shape memory component is lower than a default temperature range, the shape memory component forms as a first shape, so that the flexible display panel is capable of being located at a first position. When the temperature of the shape memory component is higher than the default temperature range, the shape memory component forms as a second shape, so that the flexible display panel is driven to be moved to a second position.

9 Claims, 4 Drawing Sheets

(56) References Cited

U.S. PATENT DOCUMENTS

| | | | |
|---|---|---|---|
| 2013/0083496 A1* | 4/2013 | Franklin | G06F 1/1626 361/749 |
| 2013/0155655 A1* | 6/2013 | Lee | H05K 5/03 362/97.1 |
| 2013/0207946 A1* | 8/2013 | Kim | G09G 3/3225 345/204 |
| 2013/0258565 A1 | 10/2013 | Nishi | |
| 2013/0329422 A1* | 12/2013 | Park | G02F 1/133305 362/233 |
| 2014/0118910 A1 | 5/2014 | Sung et al. | |
| 2014/0198465 A1* | 7/2014 | Park | H05K 5/0226 361/749 |
| 2015/0092353 A1 | 4/2015 | Baik et al. | |
| 2015/0130775 A1* | 5/2015 | Kim | G06F 1/1652 345/205 |
| 2015/0145755 A1* | 5/2015 | Yamazaki | G09G 3/32 345/76 |
| 2015/0185761 A1* | 7/2015 | Song | G06F 1/1601 361/679.21 |
| 2015/0331445 A1 | 11/2015 | Liu | |
| 2016/0088743 A1* | 3/2016 | Zhang | G06F 1/1601 361/679.01 |
| 2016/0299283 A1* | 10/2016 | Yu | H01L 51/5237 |
| 2017/0292503 A1 | 10/2017 | Lee et al. | |

\* cited by examiner

ELECTRONIC DEVICE

CROSS-REFERENCE TO RELATED APPLICATION

This application claims the priority benefit of Taiwan application serial no. 106137887, filed on Nov. 2, 2017. The entirety of the above-mentioned patent application is hereby incorporated by reference herein and made a part of this specification.

BACKGROUND OF THE INVENTION

Field of the Invention

The invention is related to an electronic device, and particularly to an electronic device having a flexible display panel.

Description of Related Art

In order to meet a variety of users' demands, existing display panels not only include conventional flat display panels but also include curved display panels. However, on the market, curved display is rarely applied to, for example, notebook computer and other portable electronic devices. One of the reasons is that, if the upper body of the notebook computer is provided with a curved display panel, when the upper body of the notebook computer is closed on the lower body, a non-uniformed gap is formed between the curved display panel and the operating surface (i.e., the surface on which the keyboard and the touch panel are located) of the lower body. The gap keeps the upper body of the notebook computer from being tightly combined with the lower body, and foreign substance is likely to get into the notebook computer easily, which increases chance of damage. In addition, the aesthetic quality of the appearance of the notebook computer in the closed state is also reduced. Moreover, the back cover of the upper body of the curved display panel is formed in an arc-shape, which increases the size of the overall notebook computer and makes it inconvenient to carry.

SUMMARY OF THE INVENTION

The invention provides an electronic device having a flexible display panel which is capable of moving between a first position and a second position. The flexible display panel is in a flat shape at the first position, which facilitates the upper body and the lower body of the electronic device to be tightly combined when they are closed relative to each other, and the flexible display panel is in a curved shape at the second position to be used as a curved display panel.

An electronic device provided by the invention includes a flexible display panel and a shape memory component. The flexible display panel is driven by the shape memory component, wherein when a temperature of the shape memory component is lower than a default temperature range, the shape memory component is formed as a first shape, so that the flexible display panel is capable of being located at a first position. When the temperature of the shape memory component is higher than the default temperature range, the shape memory component is formed as a second shape, so that the flexible display panel is driven to be moved to a second position.

In an embodiment of the invention, the electronic device further includes two supporting elements which are respectively secured on both sides of the flexible display panel and the shape memory component is connected to the supporting elements.

In an embodiment of the invention, the electronic device further includes a heat source, and the heat source is thermally coupled to the shape memory component.

In an embodiment of the invention, the electronic device further includes a heat-conducting element disposed between the heat source and the shape memory component to transmit the heat generated by the heat source to the shape memory component.

In an embodiment of the invention, the electronic device further includes a first housing, a second housing and an elastic element. The flexible display panel and the shape memory component are disposed between the first housing and the second housing, and the flexible display panel is connected to the second housing. The elastic element is disposed between the first housing and the second housing, and adapted to be deformed when the flexible display panel is moved between the first position and the second position.

In an embodiment of the invention, the elastic element is disposed around a position near the edge of the first housing and the second housing.

In an embodiment of the invention, the flexible display panel is in a flat shape at the first position, the flexible display panel is in a curved shape at the second position, and a radius of curvature of the flexible display panel at the second position ranges from 3800 mm to 4200 mm.

In an embodiment of the invention, the shape memory component is attached to the flexible display panel.

In an embodiment of the invention, the default temperature range ranges from 40° C. to 65° C.

In an embodiment of the invention, the shape memory component includes an iron-based alloy, a nickel-titanium alloy or a copper-based alloy.

In summary, the electronic device of the invention is designed in the manner that the flexible display panel is driven by the shape memory component, and the flexible display panel can be moved between the first position and the second position. When the temperature of the electronic device is lower than the default temperature, the electronic device is formed as the first shape; when the temperature of the electronic device is higher than the default temperature, the electronic device is formed as the second shape. If the electronic device is exemplified as the notebook computer, when the electronic device is not in use, the flexible display panel can be formed in the flat shape at the first position, which facilitates the upper body and the lower body of the electronic device to be closed tightly so that the appearance of the electronic device is integrated in a closed state, and the overall electronic device has a smaller thickness. When the electronic device is in use, the shape memory component is subjected to heat and deformed such that the flexible display panel is at the second position, and thus the flexible display panel can be used as a curved display panel.

In order to make the aforementioned features and advantages of the invention more comprehensible, embodiments accompanying figures are described in detail below.

DESCRIPTION OF EMBODIMENTS

Figure 1:
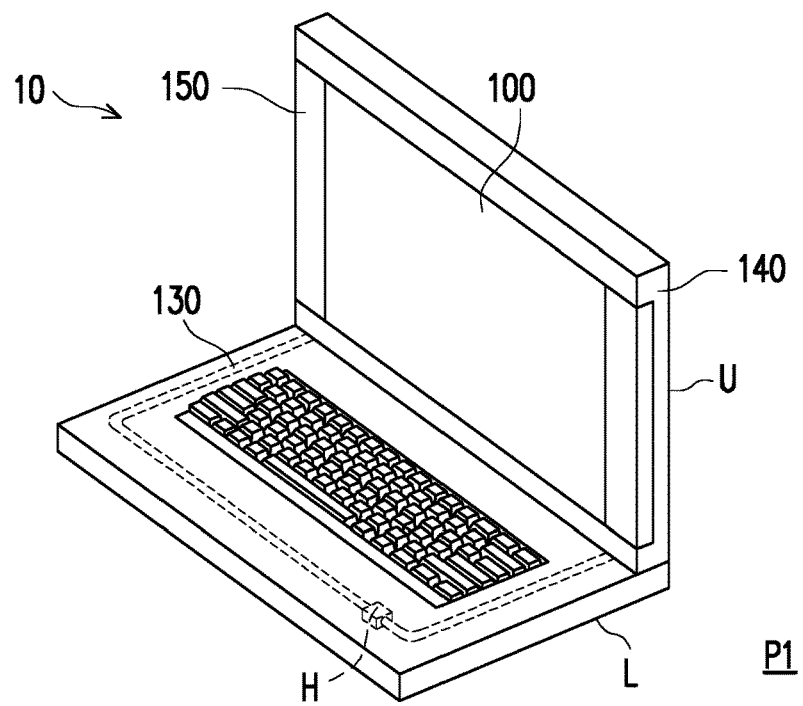
FIG. 1 is a perspective view illustrating a flexible display panel of an electronic device at a first position according to an embodiment of the invention.
Figure 2:
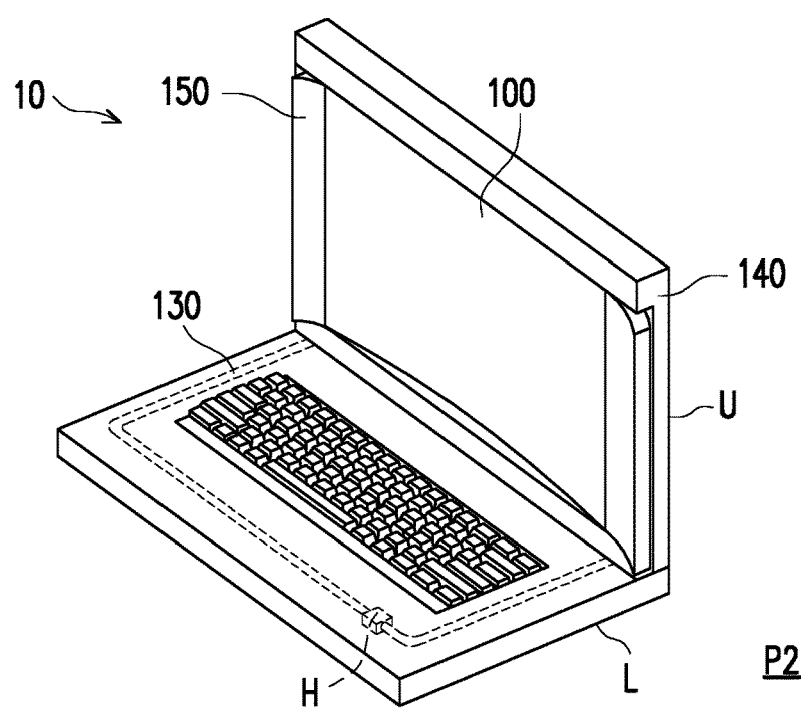
FIG. 2 is a perspective view illustrating the flexible display panel of the electronic device in FIG. 1 at a second position.

FIG. 1 is a perspective view illustrating a flexible display panel of an electronic device at a first position according to an embodiment of the invention. FIG. 2 is a perspective view illustrating the flexible display panel of the electronic device in FIG. 1 at a second position. Referring to FIG. 1 and FIG. 2, in the embodiment, an electronic device 10 is exemplified as a notebook computer. Certainly, in other embodiment, the electronic device 10 may be a tablet PC, a display and the like, which should not be construed as a limitation to the invention. In the embodiment, the electronic device 10 includes an upper body U and a lower body L, wherein the upper body U is pivoted to the lower body L, and the upper body U may be closed or opened relative to the lower body L. In the embodiment, the upper body U of the electronic device 10 includes a flexible display panel 100. In the embodiment, the flexible display panel 100 may be exemplified as a flexible organic light emitting diode panel. Certainly, the flexible display panel 100 may be other types of flexible display panel, and the invention provides no limitation to the type of the flexible display panel.

In the embodiment, the lower body L includes a heat source H and a heat-conducting element thermally coupled to the heat source H. In the embodiment, the heat source H is, for example, a CPU or a GPU, but the invention provides no limitation to the type of the heat source H. In addition, in the embodiment, the heat-conducting element is exemplified as a heat pipe 130, but the invention provides no limitation to the type of the heat-conducting element. The heat pipe 130 may be extended from the heat source H of the lower body L to the upper body U. In the embodiment, the electronic device 10 enables the flexible display panel 100 in a specific state to be automatically deformed from the flat display panel shown in FIG. 1 to the curved display panel shown in FIG. 2. Descriptions in this regard are incorporated below.

Figure 3:
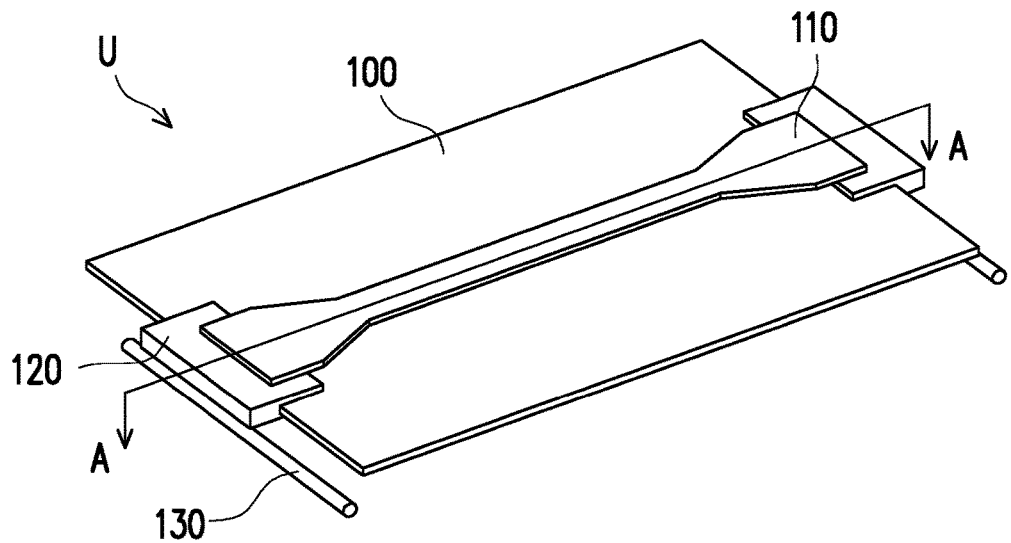
FIG. 3 is a schematic view illustrating a portion of component in an upper body of the electronic device in FIG. 1 at the first position.
Figure 4:
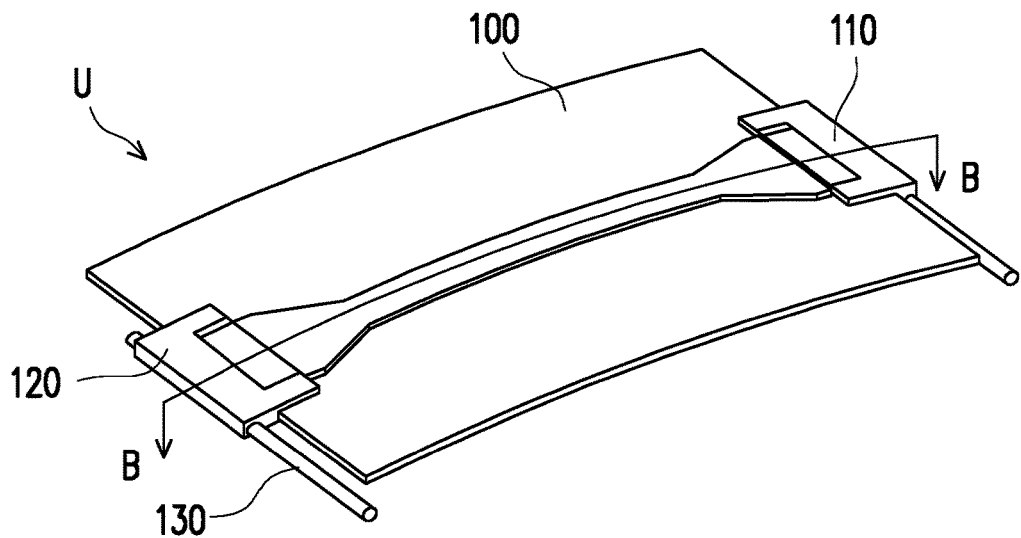
FIG. 4 is a schematic view illustrating the component in FIG. 3 deformed to be at the second position.

FIG. 3 is a schematic view illustrating a portion of component in an upper body of the electronic device in FIG. 1 at the first position. FIG. 4 is a schematic view illustrating the component in FIG. 3 deformed to be at the second position. It should be indicated that, in order to clearly describe relative relationship between the flexible display panel 100, the shape memory component 110, the supporting element 120 and a portion of the heat pipe 130 in the upper body U, FIG. 3 and FIG. 4 only schematically illustrate the above-mentioned components. Referring to FIG. 3 and FIG. 4, in the embodiment, the upper body U of the electronic device 10 is provided with the shape memory component 110 and the two supporting elements 120 therein. The two supporting elements 120 are disposed on both ends of the shape memory component 110, and connected to both ends of the flexible display panel 100. FIG. 3 shows that the heat pipe 130 extended from the heat source H of the lower body L to the upper body U is located at a position near both ends of the shape memory component 110. It should be indicted that the heat pipe 130 may be extended from the heat source H of the lower body L to a position near the shape memory component 110 on the upper body U. If the upper body U is provided with the heat source H therein, the heat pipe 130 may only be disposed in the upper body U, and extended from the heat source H to the position near the shape memory component 110.

In addition, the configuration of the heat-conducting element 130 in the drawing serves for exemplary purpose only, and the actual circumstances may be adjusted depending on the configuration of the components of the electronic device 10. The invention provides no limitation to the overlapping range of the heat-conducting element 130 and the shape memory component 110. For example, the heat-conducting element 130 may partially pass through the shape memory component 110. In another example, the heat-conducting element 130 may completely pass through the shape memory component 110, which should not be construed as a limitation to the invention. However, the invention provides no limitation to the method through which the heat source H transmits the heat to the shape memory component 110. In other embodiment, the heat source H may transmit heat to the shape memory component 110 by directly contacting the shape memory component 110 without using the heat-conducting element 130, such that the energy consumption caused by transmitting heat energy through a plurality of different media can be reduced.

In the embodiment, the material of the shape memory component 110 is a shape memory alloy (SAM). The shape memory alloy changes the shape thereof with the material which can change the metal phase thereof at a specific temperature. Furthermore, the shape memory alloy is exhibited in different phases at different temperatures, for example, the shape memory alloy is exhibited in a martersite phase at a relative low temperature, and exhibited in an austenite phase at a relative high temperature. With the characteristic of being exhibited in a different phases at different temperatures, the shape memory alloy can be deformed from an initial shape when the temperature is changed and changed back to the initial shape when the temperature is returned to the original temperature. Therefore, in the embodiment, the shape memory component 110 can be deformed spontaneously at different temperatures.

In the embodiment, the material of the shape memory component 110 is, for example, an iron-based alloy, a nickel-titanium alloy or a copper-based alloy. Certainly, the material of the shape memory component 110 is not limited thereto. The designer may select other metal that is exhibited in the martersite phase at room temperature and exhibited in austenite phase at the operating temperature of the heat source H.

In the embodiment, as shown in FIG. 1 and FIG. 3, when the electronic device 10 is not in operation, the temperature of the heat source H is relatively low, and the shape memory component 110 is formed as a first shape S1, and the flexible display panel 100 is correspondingly located at a first position P1. As shown in FIG. 2 and FIG. 4, when the electronic device 10 is in operation, the temperature of the heat source H is increased, and the heat pipe 130 transmits the heat to a position near the shape memory component 110 such that the shape memory component 110 is deformed from the first shape S1 to a second shape S2. Since the two supporting elements 120 are disposed on both ends of the shape memory component 110 and connected to both ends of the flexible display panel 100, when the shape memory component 110 is deformed, the relative positions of the two supporting elements 120 are also changed; accordingly, the flexible display panel 100 is deformed correspondingly from the first position P1 to a second position P2. In the embodiment, the flexible display panel 100 and the shape memory component 110 are not directly adhered to each other, and the flexible display panel 100 is driven by the shape memory component 110 through the supporting element 120. Certainly, in other embodiment, the flexible display panel 100 may be directly secured to the shape memory component 110 without necessarily being connected to the shape memory component 110 by the supporting element 120.

Figure 5:
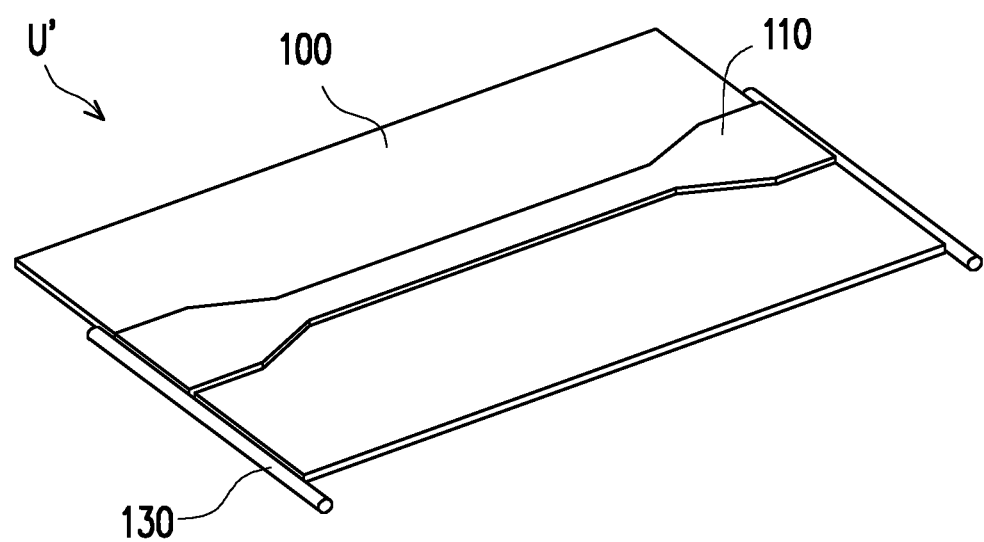
FIG. 5 is a schematic view illustrating a portion of component in an electronic device according to another embodiment of the invention.

FIG. 5 is a schematic view illustrating a portion of component in an electronic device according to another embodiment of the invention. Referring to FIG. 5, in the embodiment, the shape memory component 110 in an upper body U' may be directly attached to the flexible display panel 100 and directly drives the flexible display panel 100 to change position when the shape memory component 110 is deformed, which can reduce space for disposing the supporting element 120 and the spare space can be used for disposing other component.

Figure 6:
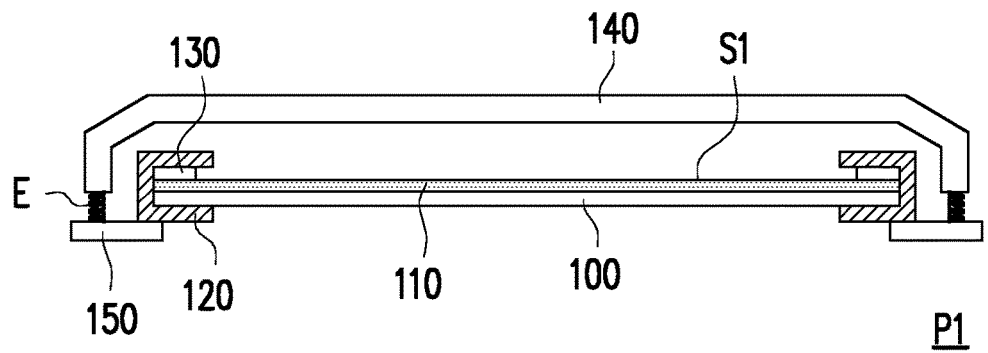
FIG. 6 is a cross-sectional view illustrating an upper body of a flexible display panel at the first position.

FIG. 6 is a cross-sectional view illustrating an upper body of a flexible display panel at the first position. The viewing angle illustrated in FIG. 6 is, for example, line A-A taken along FIG. 3. Referring to FIG. 6, the upper body U (shown in FIG. 1) of the electronic device 10 (shown in FIG. 1) is provided with a first housing 140, a second housing 150 and an elastic element E. In the embodiment, the first housing 140 is a back cover of the electronic device 10, and the second housing 150 is a front frame of the electronic device 10, which should not be construed as a limitation to the invention. The flexible display panel 100 and the shape memory component 110 are disposed between the first housing 140 and the second housing 150, and the two supporting elements 120 are connected to the second housing 150. The flexible display panel 100 has a display surface and a non-display surface, and the display surface is exposed to the second housing 150.

In the embodiment, the elastic element E is disposed between the first housing 140 and the second housing 150, and for example, disposed around a position near the edge of the first housing 140 and the second housing 150, such that the first housing 140 and the second housing 150 can be moved relatively. In the embodiment, the material of the elastic element E is a spring; the material of the elastic element E may be rubber or other elastic material. The invention provides no limitation to the material of the elastic element E. The elastic element E is adapted to be deformed when the flexible display panel 100 is moved between the first position P1 and the second position P2.

If the temperature range within which the material of the shape memory component 110 is deformed is a default temperature range T, the default temperature range T is a ranged that is exceeded when the electronic device 10 is heated by the heat source H under operation. In the embodiment, the selected default temperature range T within which the material of the shape memory component 110 is deformed may range from 40° C. to 65° C. When the temperature of the shape memory component 110 is lower than the default temperature range T, the shape memory component 110 is formed as the first shape S1 such that the flexible display panel 100 is located at the first position P1 and the shape memory component 110 is in the martersite phase, wherein the flexible display panel 100 is exhibited in the flat shape at the first position P1, which reduces the size of the electronic device 10 when the upper body U and the lower body L are closed relative to each other, and makes it more convenient to carry. In addition, since the first housing 140 is not exhibited in the arc-shape, no gap is formed when the upper body U and the lower body L are closed relative to each other, such that foreign substance from external environment cannot easily get into the electronic device 10 to cause increase of the possibility of damage to the inner component of the electronic device 10.

Figure 7:
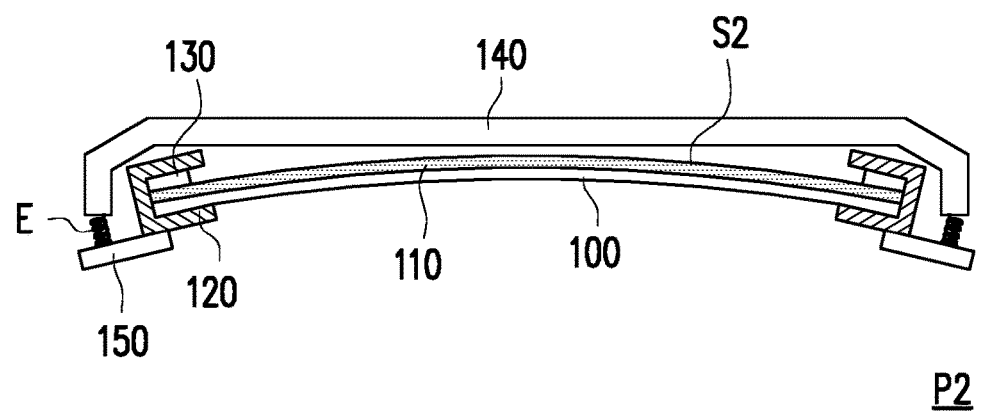
FIG. 7 is a cross-sectional view illustrating an upper body of a flexible display panel at the second position.

FIG. 7 is a cross-sectional view illustrating an upper body of a flexible display panel at the second position. The viewing angle in FIG. 7 is, for example, line B-B taken along FIG. 4. Referring to FIG. 7, when the temperature of the shape memory component 110 is higher than the default temperature range T, the heat pipe 130 transmits heat to the position near the shape memory component 110 such that the shape memory component 110 is deformed from the first shape S1 to the second shape S2. In the meantime, the shape memory component 110 is in the austenite phase. Since the two supporting elements 120 are disposed on both ends of the shape memory component 110 and connected to the both ends of the flexible display panel 100, when the shape memory component 110 is deformed, the relative positions of the two supporting elements 120 are changed as well; accordingly, the flexible display panel 100 is correspondingly deformed from the first position P1 to the second position P2.

In the embodiment, the flexible display panel 100 is in a curved shape at the second position P2, and the radius of curvature of the flexible display panel 100 at the second position P2 ranges from 3800 mm to 4200 mm. Certainly, the range of the radius of curvature of the flexible display panel 100 at the second position P2 is not limited thereto. When the flexible display panel 100 is in the curved state, the flexible display panel 100 has a better visual effect as compared with conventional flat display panel in known technologies; for example, the visible angle is broader, the depth of field is reinforced and the contrast ratio is higher as compared with conventional flat display panel.

It should be pointed out that, in the embodiment, although the first shape S1 and the second shape S2 are in flat shape and curved shape respectively, the first shape S1 and the second shape S2 may be in any shape within the deformation range of the flexible display panel, and the invention provides no limitation thereto.

Additionally, in the embodiment, since the second housing 150 is connected to the two supporting elements 120, the position of the second housing 150 is changed as well such that the elastic element E is deformed. In the embodiment, the second housing 150 is moved relative to the first housing 140 by the elastic element E as shown in FIG. 6 and FIG. 7.

It should be mentioned that the heat generated by the heat source H is waste heat generated by the electronic device 10 under operation. When conventional notebook computer processes waste heat, it is generally required to dispose a fan or a heat-dissipating fin to transmit the waste heat to the outside of the notebook computer. If the fan or heat-dissipating fin is not provided, the waste heat is accumulated in the notebook computer and causes negative effect on the component in the notebook computer. In the embodiment, the heat generated by the heat source H is transmitted to the shape memory component 110 to recycle a portion of the waste heat for reuse, so that the shape memory component 110 does not require an additional heat source. A portion of the waste heat transmitted to the shape memory component 110 can heat the shape memory component 110 to reach the temperature for phase change, such that the electrical consumption required for adding an additional heat source for heating in conventional technologies can be saved. Since a portion of the waste heat is transmitted to the shape memory component 110 for the purpose of heating, which facilitates the overall electronic device 10 to dissipate the heat. For the electronic device 10, when the sum of waste heat to be discharged is reduced, the required heat-dissipating device can be reduced or cancelled and the spare space can be used for other purpose.

In summary, the electronic device of the invention uses the shape memory component in cooperation with the flexible display panel. When the electronic device is not in use, the temperature of the shape memory component does not exceed the default temperature range, and the flexible display panel of the electronic device is maintained to be in a flat shape so that the upper body and the lower body can be tightly combined when they are closed relative to each other, which reduces the size when the upper body and the lower body are closed relative to each other and makes it more convenient to carry. Furthermore, since it is not required for the upper body to be formed in the arc-shape, the upper body can be tightly closed on the lower body, such that the foreign substance from the outer environment does not easily get into the electronic device to cause damage to the inner component of the electronic device. When the electronic device is in use, the heat source of the electronic device generates heat. At this time, the heat is transmitted to the shape memory component by the heat-conducting element, and the temperature of the shape memory component exceeds the default temperature range to generate phase change; as a result, the shape of the shape memory component is changed so that the flexible display panel is driven to be moved accordingly. Meanwhile, the flexible display panel is in the curved shape so that the user can acquire a better visual effect through the curved display panel than the flat display panel. Moreover, since the heat used by the shape memory component is the waste heat generated by the electronic device, the default temperature range can be reached or exceeded without configuration of an additional heat source for the shape memory component, and the electrical consumption required for adding additional heat source can be saved. Apart from that, since a portion of the waste heat is recycled by the shape memory component for the purpose of deformation, the sum of waste heat in the electronic device is reduced, which facilitates the electronic device to dissipate heat.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:
1. An electronic device, comprising:
a first housing;
a second housing;
a flexible display panel;
a shape memory component, the flexible display panel and the shape memory component being disposed between the first housing and the second housing, the flexible display panel being connected to the second housing and being driven by the shape memory component; and
an elastic element, disposed between the first housing and the second housing and adapted to be deformed when the flexible display panel is moved between a first position and a second position, wherein when a temperature of the shape memory component is lower than a default temperature range, the shape memory component is formed as a first shape so that the flexible display panel is located at the first position, when the temperature of the shape memory component is higher than the default temperature range, the shape memory component is deformed as a second shape and drives the flexible display panel to be moved to the second position.

2. The electronic device according to claim 1, further comprising:
two supporting elements, respectively secured on both sides of the flexible display panel, and the shape memory component being connected to the two supporting elements.

3. The electronic device according to claim 1, further comprising:
a heat source, thermally coupled to the shape memory component.

4. The electronic device according to claim 3, further comprising:
a heat-conducting element, disposed between the heat source and the shape memory component to transmit heat generated by the heat source to the shape memory component.

5. The electronic device according to claim 1, wherein the elastic element is disposed around a position near an edge of the first housing and the second housing.

6. The electronic device according to claim 1, wherein the flexible display panel is in a flat shape at the first position, the flexible display panel is in a curved shape at the second position, and a radius of curvature of the flexible display panel at the second position ranges from 3800 mm to 4200 mm.

7. The electronic device according to claim 1, wherein the shape memory component is attached to the flexible display panel.

8. The electronic device according to claim 1, wherein the default temperature range is between 40° C. and 65° C.

9. The electronic device according to claim 1, wherein the shape memory component comprises an iron-based alloy, a nickel-titanium alloy or a copper-based alloy.

* * * * *